No. 751,757. PATENTED FEB. 9, 1904.
F. SIEBERT.
BUSHING.
APPLICATION FILED JULY 16, 1903.
NO MODEL.
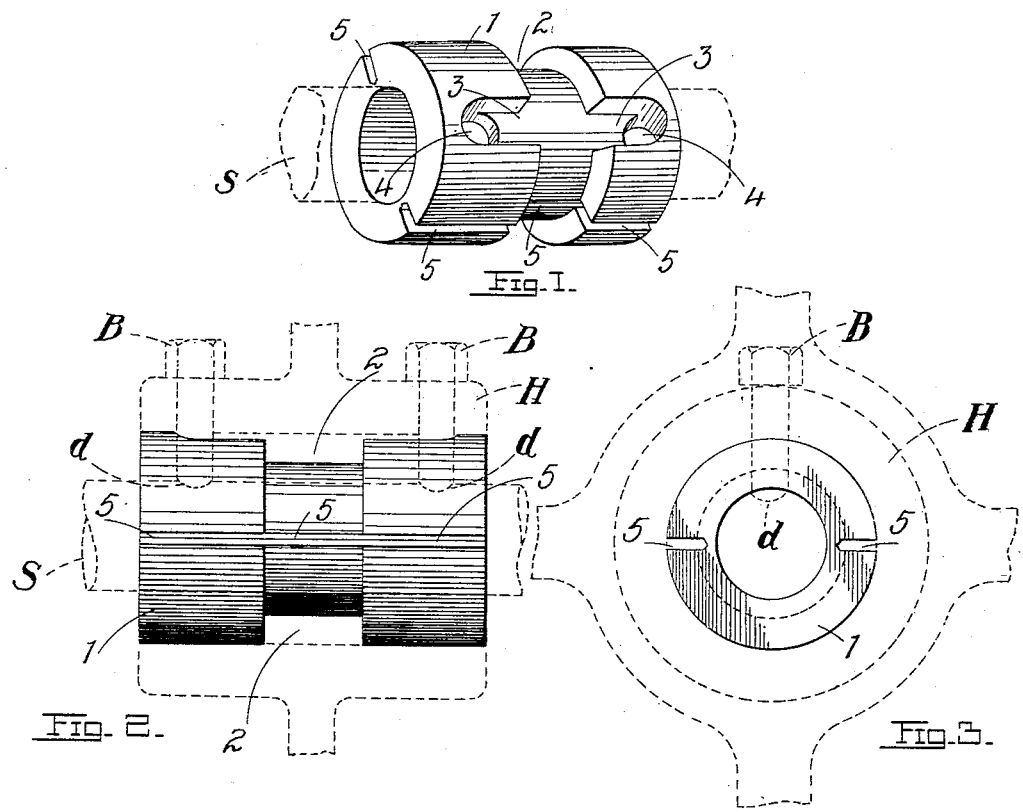
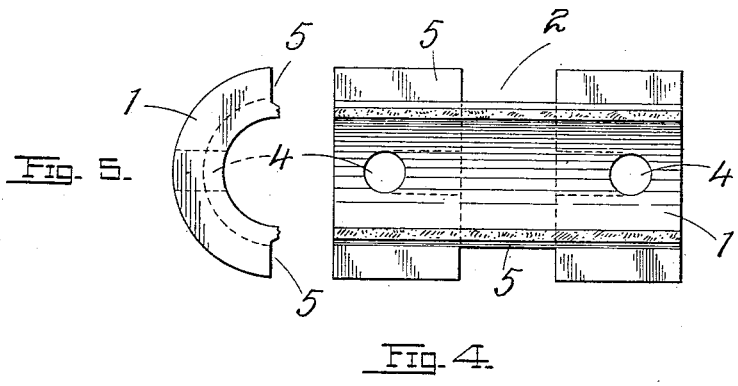
WITNESSES:
INVENTOR
Frederick Siebert
BY
Emil Starek
ATTORNEY No. 751,757. Patented February 9, 1904.

UNITED STATES PATENT OFFICE.

FREDERICK SIEBERT, OF ST. LOUIS, MISSOURI, ASSIGNOR TO AMERICAN MOTOR AND PULLEY CO., OF ST. LOUIS, MISSOURI, A CORPORATION OF MISSOURI.

BUSHING.

SPECIFICATION forming part of Letters Patent No. 751,757, dated February 9, 1904.

Application filed July 16, 1903. Serial No. 165,825. (No model.)

*To all whom it may concern:*

Be it known that I, FREDERICK SIEBERT, a citizen of the United States, residing at St. Louis, State of Missouri, have invented certain new and useful Improvements in Bushings, of which the following is a full, clear, and exact description, reference being had to the accompanying drawings, forming a part hereof.

My invention has relation to improvements in bushings for fast pulleys; and it consists in the novel construction of bushing more fully set forth in the specification and pointed out in the claims.

In the drawings, Figure 1 is a perspective view of the bushing. Fig. 2 is a plan thereof, showing dotted views of the pulley hub and shaft. Fig. 3 is an end view of Fig. 2; Fig. 4, an inside view of one of the halves or sections of the bushing after being split, and Fig. 5 is an end view of Fig. 4.

The object of my invention is to construct a bushing for fast pulleys capable of use in connection with either cast or split pulleys, as will better presently appear. The bushing is initially made of a single piece of metal designed for use with a pulley cast of one piece; but it is so constructed that it may be split into two halves or sections when occasion arises to employ the same in connection with a split pulley.

In detail the invention may be described as follows:

Referring to the drawings, 1 represents the cylindrical body portion of the bushing, the same being provided with an annular or transverse central groove 2 for lightening the same. Extending from the walls of the groove 2 in either direction are longitudinal recesses 3, terminating a short distance from the adjacent ends of the bushing. At the outer ends of the recesses are bolt-holes 4 4 for the reception of the screw-bolts B, the latter passing through the hub H of the pulley and entering suitable shallow depressions *d*, formed in the shaft S.

Disposed along the periphery of the bushing at points diametrically opposite one another and removed each ninety degrees from the central longitudinal line of the recesses 3 3 are longitudinal grooves 5 5, extending the full length of the bushing and extending to a depth interior to or within the cross-sectional circle of the base of the annular groove 2. (See Fig. 3.) By this arrangement there is left a reduced thickness of metal between the base of each groove 5 and the inner wall of the bushing along which the normally integral sections or halves of the bushing can be split and separated, Figs. 4, 5, when occasion requires their use in connection with split pulleys. The grooves 5 5 may be termed the "fracture-grooves," as it is along the bases thereof along which the bushing can be fractured or split, the grooves insuring such fracture along a truly straight or direct line.

From the foregoing it is apparent that it is sufficient to provide only one of the halves or sections of the bushing with bolt-holes 4 and with the recesses 3, at the ends of which said holes are located, although a modification of the arrangement would not necessarily be a departure from the present invention.

When circumstances permit the use of a pulley cast in one piece, then the present bushing is used with its respective sections or halves integrally united. When from the nature of things a cast pulley cannot be used and a split pulley is necessary, the bushing is split into its respective sections, the latter separating along lines defined by the bases of the fracture-grooves 5 5. In addition to the groove 2 serving to lighten the bushing it at the same time facilitates the formation of the fracture-grooves, there being less metal to cut through for the purpose.

Having described my invention, what I claim is—

1. A bushing comprising a cylindrical body portion having longitudinal peripheral grooves and having an annular central groove, and recesses extending from said annular groove in opposite directions along the body portion, said recesses terminating a short distance from the opposite ends of the bushing, the latter being provided with bolt-holes at the outer ends of the recesses, the bases of the fracture-grooves extending to a depth interior to the cross-sectional circle of the base of the annular groove, substantially as set forth.

2. A bushing comprising a cylindrical body portion having longitudinal peripheral fracture-grooves, and having an annular central groove, the base of said annular groove being disposed along a cylinder the circle of whose cross-section is exterior to the bases of the fracture-grooves, the bushing being provided with bolt-holes on either side of the annular groove, substantially as set forth.

In testimony whereof I affix my signature in presence of two witnesses.

FREDERICK SIEBERT.

Witnesses:
EMIL STAREK,
MARY D. WHITCOMB.